United States Patent [19]

Leidich

[11] 3,855,541

[45] Dec. 17, 1974

[54] CURRENT PROPORTIONING CIRCUIT

[76] Inventor: Arthur John Leidich, Flemington, N.J.

[22] Filed: Oct. 5, 1973

[21] Appl. No.: 404,123

[52] U.S. Cl. .................... 330/22, 323/9, 323/22 T, 330/38 M, 330/40

[51] Int. Cl. .................................... H03f 3/04

[58] Field of Search............ 323/4, 9, 22 T; 330/22, 330/38 M, 40

[56] References Cited

UNITED STATES PATENTS

| | | | |
|---|---|---|---|
| 3,717,821 | 2/1973 | Amemiya et al. | 330/26 |
| 3,721,893 | 3/1973 | Davis | 323/9 X |

*Primary Examiner*—Siegfried H. Grimm

*Attorney, Agent, or Firm*—H. Christoffersen; S. Cohen

[57] ABSTRACT

A terminal to which an input current is applied is connected to the base and the collector electrodes of a first transistor by a first and a second direct current conductive path, respectively. Each of these paths contains the same number of semiconductor junctions, poled to be forward biased by a fraction of the input current. The emitter-to-collector potential of the first transistor is applied to the base-emitter junction of a second transistor. The second transistor responds with a collector current which is proportional to the input current divided by substantially the following quantity: the common-emitter forward current gain ($h_{fe}$) of the first transistor raised to an integral power.

9 Claims, 8 Drawing Figures

CURRENT PROPORTIONING CIRCUIT

The present invention relates to current proportioning circuits and in particular to the type in which an output current is developed which is proportional to an input current divided by substantially the following quantity: the common-emitter forward current gain of a transistor raised to a power.

Current proportioning circuits having these characteristics were first described in U.S. Pat. application Ser. No. 302,866, filed Nov. 1, 1972, in the name of A. A. A. Ahmed; entitled "Stabilization of Quiescent Collector Potential of Current-Mode Biased Transistors" and assigned, like the present application to RCA Corporation. Current proportioning circuits which provide output currents related to input currents inversely as forward common-emitter current gains of transistors have been discussed in U.S. Pat. application Ser. No. 363,563, filed May 24, 1973, in my name; entitled "Bias Circuitry for Stacked Transistor Power Amplifier Stages" and also assigned to RCA Corporation.

A current proportioning circuit which embodies the present invention has a first and a second transistor. A terminal to which input current is applied is connected to the base and the emitter electrodes of the first transistor by a first and a second direct current conductive path, respectively. Each of these direct current conductive paths contains the same number, *n*, of the semiconductor junctions. These semiconductor junctions are poled in the respective paths so as to be forward biased by the fraction of the input current flowing through its path. The emitter-to-collector potential of the first transistor is applied to the base-emitter of the second transistor, which responds with a collector current inversely proportional to the common-emitter forward current gain of the first transistor raised to a power.

Figure 1:
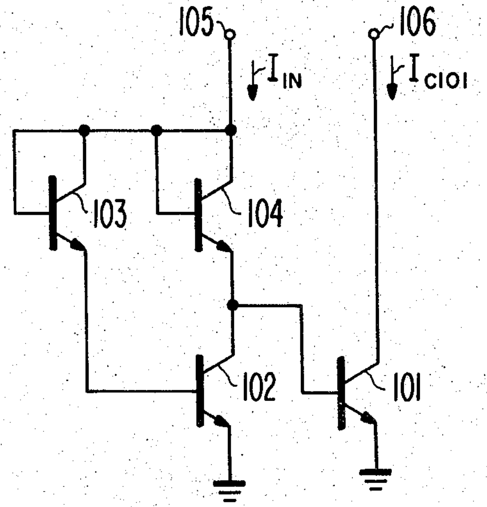
FIG. 1 is a schematic diagram of a current proportioning circuit which embodies the present invention and which develops an output current equal to its input current divided by the quantity one plus the common-emitter forward current gain of a transistor.

The circuit of FIG. 1, in normal practice, is formed as a monolithic integrated circuit. With the transistors 101–104 connected as shown, the base-emitter potential $V_{BE101}$ of grounded-emitter -emitter transistor 101 is equal to the base-emitter offset potential $V_{BE102}$ of transistor 102 plus the base-emitter offset potential $V_{BE103}$ of diode-connected transistor 103 minus the base-emitter offset potential $V_{BE104}$ of diode-connected transistor 104. That is:

$$V_{BE101} = V_{BE102} + V_{BE103} - V_{BE104} \quad (1)$$

The base emitter potential ($V_{BE}$) of any transistor can be expressed in terms of its collector current ($I_C$) according to the well-known equation:

$$V_{BE} = kT/q \; 1n \; I_C/I_S, \text{ where} \quad (2)$$

*k* is Boltzmann's constant,
*q* is the charge on an electron,
*T* is absolute temperature and
$I_S$ is the saturation current of the transistor.

Substituting equation 2 into equation 1 will yield equation 3, following, in which numerical subscripts correspond to the number of the transistor to which the quantity pertains.

$$kT/q \; 1n \; (I_{C101}/I_{S101}) = (kT/q) \; 1n \; (I_{C102}/I_{S102}) + (kT/q) \; 1n \; (I_{C103}/I_{S103}) - (kT/q) \; 1n \; (I_{C104}/I_{S104}). \quad (3)$$

Assuming transistors 101, 102, 103 and 104 to be substantially identical to each other (a valid assumption for such devices when they are all part of the same monolithic integrated circuit) and therefore to have matched characteristics, $$I_{S101} = 1_{S102} = I_{S103} = I_{S104}. \quad (4)$$

The foregoing assumption permits equation 3 to be simplified to the following equation 5.

$$I_{C101} = (I_{C102}/I_{C104}) \; I_{C103}. \quad (5)$$

The current $I_{IN}$ applied to the input terminal 105 will flow principally in the serially connected collector-to-emitter paths of transistors 104 and 102, assuming transistors with common-emitter forward current gains ($h_{fe}$'s) in the normal range of 30 to 200, since the emitter current of transistor 103 need only be large enough to supply the base current of transistor 102. The base currents of transistors 102 and 104 will be negligibly small compared to their collector-to-emitter currents for the normal range of $h_{fe}$, and the collector-to-emitter currents of transistors 104 and 102 will be nearly equal to each other. So, the collector current of transistor 101 will be nearly equal to that of transistor 103, per equation 5.

$I_{C103}$, since it is substantially equal to the emitter current of transistor 103 flowing as the base current of transistor 102, will be equal to $I_{C102}$ divided by $H_{fe102}$. Since $I_{C102}$ is substantially equal to $I_{IN}$, $I_{C103}$ is substantially equal to $I_{IN}/h_{fe102}$. $I_{C101}$, being substantially equal to $I_{C103}$, will also be substantially equal to $I_{IN}/h_{fe102}$. The circuit of FIG. 1 operates as a current supply and provides, to good approximation, an output current (the collector current $I_{C101}$ of transistor 101) which is inversely proportional to transistor $h_{fe}$. This current supply can operate with potentials as low as the saturation voltage of transistor 101 ($V_{SAT101}$, which is only about 0.2 volts).

A more precise analysis may be made as follows. $I_{C101}$ is relatively small compared to $I_{IN}$ as has been shown just above. The base current of transistor 101, $I_{B101}$, is smaller by $h_{fe101}$, the common-emitter forward gain of transistor 101. $I_{B101}$ is therefore negligibly small. $I_{IN}$ must flow as emitter current in transistor 101 except for this negligibly small $I_{B101}$. The emitter current of a transistor being known to equal its base current plus its collector current, which is $h_{fe}$ times larger than its base current the following expression for $I_{C102}$ in terms of $I_{IN}$ obtains.

$$I_{C102} = (h_{fe102}/h_{fe102} + 1)\ I_{IN}. \tag{6}$$

Also, since $I_{B101}$ is negligibly small, the emitter current of transistor 104 must be very nearly equal to $I_{C102}$. Using the same techniques used to obtain 6, the following expression for $I_{C104}$ is obtained.

$$I_{C104} = (h_{fe104}\ /h_{fe104} + 1)\ I_{C102}. \tag{7}$$

The base current $I_{B102}$ of transistor 102 is supplied by the emitter current $I_{E103}$ of transistor 103.

$$I_{B102} = I_{E103}.$$

$$I_{C102}/h_{fe102} = (h_{fe103} + 1/h_{fe103})\ I_{C103}. \tag{8}$$

Rearranging:

$$I_{C103} = (h_{fe103}/h_{fe103} + 1)\ c102/h_{fe102}. \tag{9}$$

substituting equations 6, 7 and 9 into equation 5 yields:

$$I_{C101} = \frac{\left(\frac{h_{fe102}}{h_{fe102}+1}\right)}{\left(\frac{h_{fe104}}{h_{fe104}+1}\right) I_{C102}} \left(\frac{h_{fe103}}{h_{fe103}+1}\right) \frac{I_{C102}}{h_{fe102}}.$$

which reduces to:

$$I_{C101} = I_{IN}/(h_{fe102} + 1)\ h_{fe103}\ (h_{fe104} + 1)/h_{fe104}\ (h_{fe104} + 1). \tag{10}$$

Assuming $h_{fe103}$ to equal $h_{fe104}$, which should be the case since transistors 103 and 104 have already been assumed to be substantially identical, equation 10 reduces to:

$$I_{C101} = I_{IN}/h_{fe102} + 1 \tag{11}$$

where $I_{C101}$ is the output current of the proportioning circuit. If $h_{fe102}$ is in the normal range of 30 to 200, the original approximation that $I_{C101}$ equals $I_{IN}/h_{fe102}$ is accurate within ½ to 3 percent.

Transistors 101, 102, 103 and 104 have been assumed not only to have similar diffusion profiles but to have similar base-emitter junction areas such that their saturation currents are equal to each other. A more general case is that in which the base-emitter junctions of transistors 101, 102, 103 and 104 have effective areas which are in *a:b:c:d* ratio, respectively. This causes the saturation currents of transistors 101, 102, 103 and 104 ($I_{S101}$, $I_{S102}$, $I_{S103}$ and $I_{S104}$, respectively) to be in *a:b:c:d:*ratio, respectively. In such case, the steps previously taken to obtain equation 5 will yield equation 12 following.

$$I_{C101}/a = (I_{C102}/\mathrm{b})/(I_{C104}/\mathrm{d})\ (I_{C103}/\mathrm{c}) \tag{12}$$

Steps similar to those used in developing equation 10 will yield the following approximation for $I_{C101}$ for the more general case $$I_{C101} = ad/bc\ IN/h_{fe102} + 1 \tag{13}$$

Some departure from this approximation may occur where the base currents (assumed to be negligible in the special case where transistors 101, 102, 103 and 104 are susbstantially identical) are in fact large enough that the base currents should be taken into account in the calculations. Modifications of the calculations to apply under such circumstances are similar to those employed for other circuits where base currents may not be neglected and need not be discussed here.

Another special case which is often of interest in monolithic integrated circuitry is the case where $I_{C101}$ is to be made small despite the inavailability of large resistance resistors to provide for diminished currents, that is, the case in which $I_{IN}$ cannot be easily reduced to a low level. In such instance, the base-emitter junctions of transistors 102 and 103 can be made to have larger areas than the base-emitter junctions of transistors 101 and 104. This technique is particularly interesting in biasing Class B amplifier transistors with $h_{fe}$ dependent currents as discussed in the above-mentioned U.S. Pat. application Ser. No. 363,563.

Figure 2:
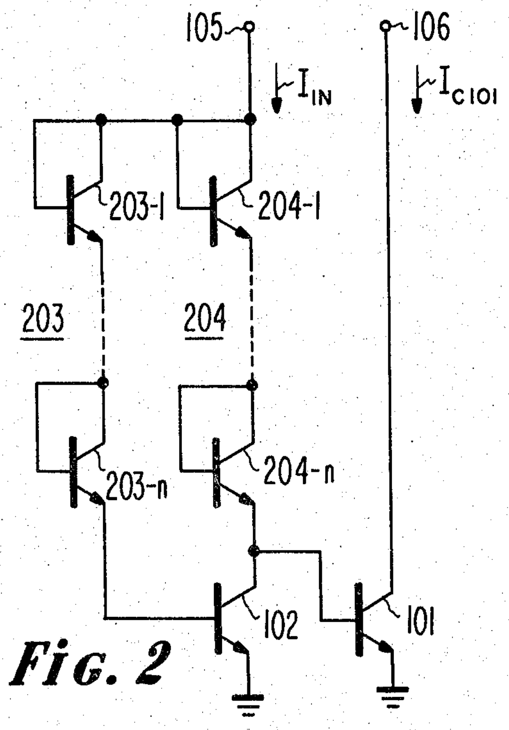
FIG. 2 is a schematic diagram of a current proportioning circuit, which embodies the present invention and which develops an output current substantially inversely proportional to the common-emitter forward current gain of a transistor raised to the power *n;*

The FIG. 2 circuit provides an output current — $I_{C101}$ which is, to good approximation, inversely proportional to integral powers of the $h_{fe}$ of a transistor. The FIG. 2 circuit can be viewed as a modification of the FIG. 1 circuit. A series combination 203 of a number *n* of diode-connected transistors 203-1 . . . **203-*n*, two of which are shown, replaces the single diode-connected transistor 103; a series combination 204 of a number n of diode-connected transistors 204-1 . . . 204-*n* (two of which are shown) replaces the single diode-connected transistor 104. In the FIG. 2 circuit, assuming each of the diode-connected transistors in combination 203 to be identically similar to diode-connected transistor 103 and each of the diode-connected transistors in combination 204 to be identically similar to diode-connected transistor 104,** the following equation is descriptive of the operation.

$$V_{BE101} = V_{BE102} + nV_{BE103} - nV_{BE104} \tag{14}$$

Substituting equation 2 into equation 14, equation 15 is obtained:

$$kT/q\ \ln\ I_{C101}/I_{S101} = kT/q\ \ln\ I_{C102}/I_{S102} + nkT/q\ \ln\ I_{C103}/I_{S103} - nkT/q\ \ln\ I_{C104}/I_{S104} \tag{15}$$

Assuming $I_{S101}:I_{S102}:I_{S103}:I_{104}::a:b:c:d$, equation 15 can be simplified to the following:

$$I_{C101} = a/b\ I_{C102}\ d/c\ (I_{C103}/I_{C104})^n. \tag{16}$$

Substituting equations 6, 7 and 9 into equation (15), the following expression is obtained for $I_{C101}$.

$$I_{C101} = a/b\ (d/c)^n\ I_{IN}/h_{fe102}{}^{n-1}(h_{fe102} + 1)$$

Figure 3:
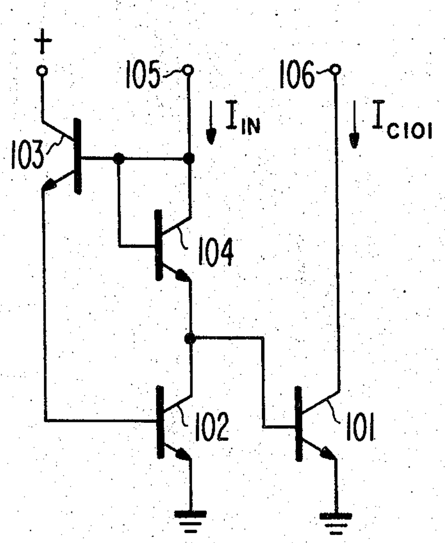
FIG. 3 is a schematic diagram of a current proportioning circuit similar to that shown in FIG. 1, but in which the output current is substantially inversely proportional to the common-emitter forward current gain of a transistor.

FIG. 3 shows a modification of the FIG. 1 circuit, in which the collector electrode of transistor 103 is connected to an operating potential provided separately from the $I_{IN}$ supply. In the FIG. 3 circuit the base current of transistor 102 is supplied principally through the collector-to-emitter path of transistor 103. Again, assuming the base current of transistor 101 to be negligible, $I_{IN}$ will flow substantially entirely as the collector current of transistor 102. That is, instead of the relationship of equation 6, the following equation obtains $$I_{C102} = I_{IN} \qquad (17)$$

This will modify equations 9 and 10 to the forms expressed in equations 18 and 19

$$I_{C101} = \frac{I_{IN}}{\frac{h_{fe104}}{h_{fe104}+1} I_{C102}} \cdot \frac{h_{fe103}}{h_{fe103}+1} \cdot \frac{I_{C102}}{h_{fe102}} \qquad (18)$$

$$I_{C101} = ad/bc\ I_{IN}/h_{fe102} \qquad (19)$$

Figure 4:
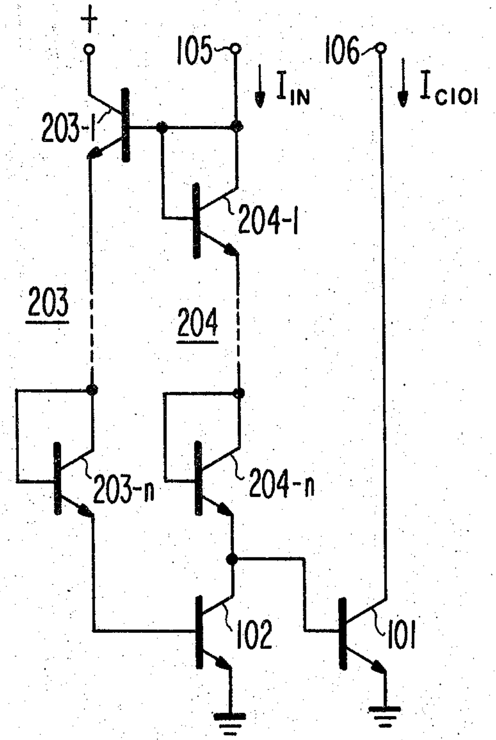
FIG. 4 is a schematic diagram of a current proportioning circuit similar to that shown in FIG. 2; but with better characteristics for some uses.

FIG. 4 shows a modification of the FIG. 2 circuit in which the collector electrode of transistor 203-1 is connected to an operating potential provided separately from the $I_{IN}$ supply. This connection provides for the following value of $I_{C101}$.

$$I_{C101} = a/b\ (d/c)^n\ I_{IN}/h_{fe102}n \qquad (20)$$

Figure 5:
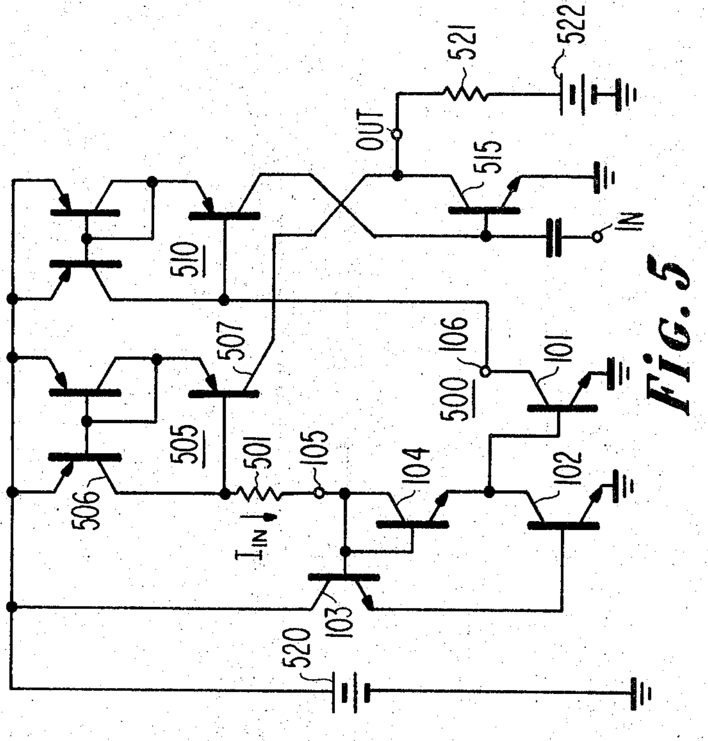

In FIG. 5, a current proportioning circuit 500 of the type shown in FIG. 3 is used to develop proper quiescent currents for current-mode biasing of common-emitter amplifier transistor 515. The input current $I_{IN}$ of current proportioning circuit 500 is drawn via terminal 105 and resistor 501 from the input circuit of a current mirror amplifier 505, and its output current is drawn via terminal 106 from the input circuit of a current mirror amplifier 510. Current mirror amplifiers 505 and 510 have current gains in the ratio *ab:bc*, respectively. Therefore, the quiescent currents supplied by the output circuits of current mirror amplifiers 505 and 510 to the collector and to the base electrodes, respectively, of common-emitter amplifier transistor 515 are in the ratio $h_{fe102}$:1 respectively. Assume transistor 515 has an $h_{fe}$ which matches that of transistor 102. The quiescent base current supplied to transistor 515 will be amplified $h_{fe102}$ times to cause the quiescent collector current demanded by transistor 515 to equal the quiescent current supplied by the output circuit of current mirror amplifier 505.

The collector load impedance of common-emitter amplifier transistor 515 and the quiescent potential at the output terminal OUT connected to the collector electrode of transistor 515 will each be determined by succeeding circuitry. This is represented in Thevenin equivalent form in FIG. 5 by the series combination of a resistor 521 which provides collector load impedance to transistors 515 and a power supply 522, which supplies a quiescent potential $E_{522}$ intermediate ground and $E_{520}$. Since the quiescent current supplied by the output circuit of current mirror amplifier 505 is equal to the quiescent collector current demanded by transistor 515, by Kirchoff's Current Law, there is no quiescent current flow through resistor 521. Therefore, there is no quiescent potential drop across resistor 521, and a quiescent potential equal to $E_{522}$ appears at output terminal OUT.

Transistor 102 of circuit 500 may be viewed as a voltage-regulating transistor provided with collector-to-base degenerative feedback to maintain terminal 105 at a potential equal to $V_{BE102} + V_{BE103}$. (Any increase of the potential at terminal 105 above this value will cause greatly increased $I_{C102}$. The increased $I_{C102}$ will increase the potential drop appearing across resistor 501 to reduce the potential at terminal 105.) The current mirror amplifier 505 is of a type which regulates its input potential to $V_{BE506} + V_{BE507}$—that is, to the sum of the base-emitter offset potentials of transistors 506 and 507. The potential $V_{501}$ appearing across resistor 501 will be equal to $E_{520}$, the potential supplied by power supply 520, minus $V_{BE102} + V_{BE103}$ and minus $V_{BE506} + V_{BE507}$. The current $I_{IN}$ flowing through resistor 501 to input terminal 105 can be determined according to Ohm's Law.

$$I_{IN} = E_{520} - V_{BE102} - V_{BE103} - V_{BE506} - V_{BE507}/R_{501} \qquad (21)$$

where $R_{501}$ is the resistance of resistor 501. $V_{BE102}$, $V_{BE103}$, $V_{BE506}$ and $V_{BE507}$ are well-defined relatively unchanging offset potentials over a wide range of currents, being between 550 and 750 millivolts each for silicon transistors. $I_{IN}$, as amplified by current mirror amplifier 505 determines the quiescent collector current level of transistor 515.

Figure 6:
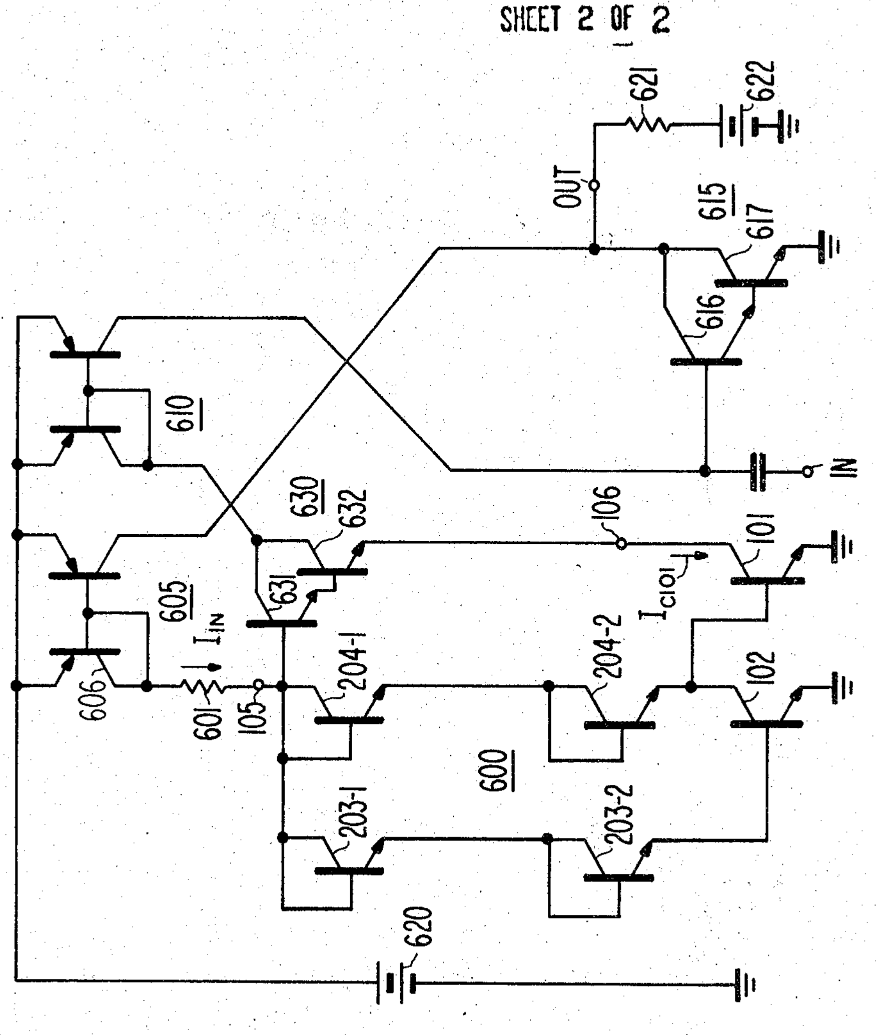
FIGS. 5 and 6 are schematic diagrams illustrating the use of current proportioning circuits of the type shown in FIGS. 3 and 2, respectively.

In FIG. 6, a current proportioning circuit 600 of the type shown in FIG. 2 is used to develop properly proportioned quiescent currents for current mode biasing of a Darlington pair 615 connected as a common-emitter amplifier for signal. The circuit is generally analagous to that shown in FIG. 5. According to Ohm's Law, $$I_{IN} = E_{620} - V_{BE102} - V_{BE203\text{-}2} - V_{BE203\text{-}1} - V_{BE606}/R_{601} \qquad (22)$$

where:

$E_{620}$ is the potential supplied at positive terminal of supply 620;

$V_{BE102}$ is as before the base-emitter offset potential of transistor 102;

$V_{BE203\text{-}1}$ and $V_{BE203\text{-}2}$ are the base-emitter offset potentials of serially connected diode-connected transistors 203-1 and 203-2, and $V_{BE606}$ is the base-emitter offset potential of diode connected transistor 606 in the input circuit of current mirror amplifier 605.

$I_{IN}$ flows through the input circuit of current mirror amplifier 605 giving rise to a related current flow in its output circuit, which related current flow is to supply the combined quiescent collector currents demanded by transistors 616 and 617 of Darlingtonn pair 615.

As noted in the discussion of FIG. 2, the collector current $I_{C101}$ of transistor 101 in current proportioning circuit 600 will conform to equation 20, where $n = 2$. That is, $$I_{C101} = ad^2/bc^2\ I_{IN}/h_{fe102}\ (h_{fe102} + 1) \qquad (23)$$

This current is coupled by the common-base amplifier action of Darlington pair 630 with substantially unity current gain to the input circuit of a current mirror amplifier 610. Current mirror amplifiers 605 and 610 have current gains in the ratio $ad^2:bc^2$, respectively. Therefore, the quiescent currents supplied by the output circuits of current mirror amplifiers 605 and 610 respectively to the joined collector electrodes of transistors 616 and 617 and to the base electrode of transistor 616 are in the ratio $h_{fe102}$ $(h_{fe102}+1)$:1, respectively.

The forward current gain of the Darlington pair 615 is $h_{fe616}$ $(h_{fe617}+1)$, where $h_{fe616}$ and $h_{fe617}$ are the common-emitter forward current gains of transistors 616 and 617, respectively. Assuming transistors 102, 616 and 617 to be substantially identical transistors and their $h_{fe}$'s to match, the quiescent base current supplied to transistor 616 from current mirror amplifier 605 will cause combined quiescent collector current demands in transistors 616 and 617 essentially equal to the current supplied from the output circuit of current mirror amplifier 605. As in the FIG. 5 amplifier circuit, the FIG. 6 amplifier circuit will have the signal amplifier load impedance and the quiescent potential at output terminal OUT determined by succeeding circuitry, represented by Thevenin equivalent circuit comprising the serially connected load resistor 621 and power supply 622.

Darlington pair 630 comprising transistors 631 and 632 is connected at its input terminal to the $3V_{BE}$ potential (i.e., $V_{BE102}+V_{BE203\text{-}1}+V_{BE203\text{-}2}$) appearing at terminal 105. The potential drops provided by base-emitter offset potentials of transistors 631 and 632 — $V_{BE631}$ and $V_{BE632}$, respectively—bias terminal 106 to a $1V_{BE}$ potential. This causes the collector-to-emitter potential of transistor 101 to be substantially the same as the collector-to-emitter potentials of transistors 102,203-1, 203-2, 204-1 and 204-2, improving the proportioning of their characteristics and in consequence thereof the accuracy of the current proportioning circuit 600 in providing a current related to $I_{IN}$ according to equation 23.

Other, similar arrangements for maintaining a $1V_{BE}$ collector-to-emitter potential on transistor 101 using common-base amplifier transistor biased from the semiconductor junctions in the collector circuitry of transistor 102 are also possible. For instance, the current proportioning circuit of FIG. 1 may additionally include a common-base amplifier transistor having its base and emitter electrodes connected to terminals 105 and 106, respectively, and demanding a collector current substantially equal to $I_{C101}$.

Figure 7B:
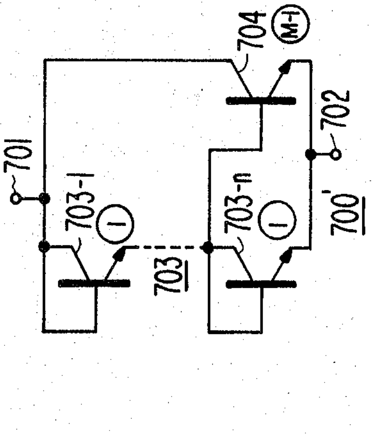
FIG. 7*b* shows an equivalent circuit useful for replacing the serial diode connection of FIG. 7*a*.
Figure 7A:
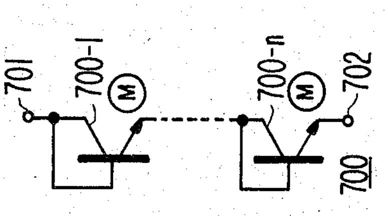
FIG. 7*a* shows a serial diode connection as appears in the FIG. 2 and FIG. 4 configurations.

FIGS. 7*a* and 7*b* show two circuits 700 and 700' which are known to provide equivalent characteristics between their terminals 701 and 702. Circuit 700 comprises *n* diode-connected transistors **700-1 . . . 700-*n* serially connected between terminals 701 and 702. Each of the transistors 700-1, . . . 700-*n*** has a base-emitter junction with effective area *m*. The effective areas of the base-emitter junction of transistors in FIGS. 7*a* and 7*b* are indicated by encircled numerals or letters near their respective emitter electrodes.

In circuit 700' there are *n* diode-connected transistors 703-1, . . . 703-n in serial combination 703 connecting terminals 701 and 702. Each of the transistors **703-1, . . . 703-*n* has a base-emitter junction with an effective junction area m times smaller than that of transistors 700-1, . . . 700-*n*. The current density in the diode-connected transistors 703-1, . . . 703-*n* is kept at the same level as was the case with diode-connected transistors 700-1, . . . 700-*n* by parallelling the serial combination 703 with the collector-to-emitter path of a transistor 704. Transistor 704** has a base-emitter junction with an effective area *m*-1 times as large as that of any one of the transistors 703-1, . . . 703-n and is biased to have the same base-emitter potential as 703-1.

Circuits of the type 700' may replace circuits of the type 700 in serial combinations 203, 204 or portions thereof. Such replacement reduces the chip area required on a monolithic semiconductor integrated circuit to achieve the equivalent of serially connected diode-connected transistors having large area base-emitter junctions.

A transistor having its base electrode connected to its collector electrode is conventionally used in certain monolithic semiconductor circuitry to provide the electrical equivalent of a diode between its collector and emitter electrodes. However, a simple PN junction may replace this transistor configuration in any of the configurations shown in the FIGURES. A number of transistors or diodes may be parallelled to form a composite device with altered junction characteristics, as is known.

What is claimed is:

1. A circuit for conditioning a first transistor to have an output current flow in its emitter-to-collector path which is a fraction of the current flowing in the emitter-to-collector path of a second transistor, each of said first and second transistors also having a base-to-emitter path and a base electrode, said conditioning circuit comprising, in combination:

an input terminal for an input current;

an output terminal for said output current to which said first transistor collector electrode is connected;

a common terminal to which the emitter electrodes of said first and said second transistors are connected;

two non-linear circuit means having substantially the same current versus voltage characteristics each of said non-linear circuits maintaining an offset potential thereacross logarithmically related to the current flow therethrough, one said non-linear circuit means connected between said input terminal and said collector electrode of said second transistor for conducting a first portion of said input current flowing as the collector current of said second transistor and the other such non-linear circuit means connected between said input terminal and the base electrode of said second transistor for conducting a second portion of said input current flowing as the base current of said second transistor; and means for maintaining the potential across the base-to-emitter path of said first transistor at the potential appearing across the collector-to-emitter path of said second transistor.

2. In combination:

first and second transistors, each having a base electrode and an emitter electrode with a base-emitter junction therebetween and each having a collector electrode, said first transistor base electrode being connected to said second transistor collector electrode;

a first terminal for connection to a reference potential to which the emitter electrodes of said first and said second transistors are connected;

a second terminal connected to said first transistor collector electrode for connection to current utilization means;

a third terminal for application of input current;

a first and a second direct current conductive path connecting said third terminal to the base and the collector electrodes, respectively, of said second transistor, each of said first and said second conductive paths being serially connected in the forward direction, through an equal number *n* of semiconductor junction devices, where *n* is an integer equal to at least one, whereby said first transistor collector current will respond to said input current in substantially inverse proportion to the common-emitter forward current gain of said second transistor raised to a power.

3. The combination set forth in claim 2, wherein each of said semiconductor junction devices comprises a transistor having a base electrode and an emitter electrode with a base-emitter junction therebetween and having a collector electrode to which its said base electrode is connected.

4. The combination set forth in claim 2 wherein said first path includes the base-emitter junction of a third transistor, said third transistor also having a collector electrode, said third transistor base electrode being connected to said third terminal, said third transistor base-emitter junction providing a said semiconductor junction device in said first direct current conductive path, and means for applying an operating potential for said third transistor between its collector electrode and said first terminal.

5. The combination set forth in claim 4 wherein each of the 2*n*−1 rest of the semiconductor junction devices in said first and said second paths comprises a transistor having a base electrode and an emitter electrode with a base-emitter junction therebetween, each having a collector electrode to which its said base electrode is connected.

6. The combination set forth in claim 2 further including:

a fourth terminal for connection to a point of operating potential relative to said reference potential; and a resistive element included in a direct current conductive coupling of said third terminal to said fourth terminal.

7. The combination set forth in claim 2 further including:

a current mirror amplifier having an input circuit connected to said second terminal and having an output circuit;

a third transistor having a base electrode direct coupled to said current mirror amplifier output circuit, having an emitter electrode connected to said first terminal and having a collector electrode;

a fourth terminal for connection to a supply of operating potential referred to said reference potential; and load means connected between said fourth terminal and the collector electrode of said third transistor.

8. The combination set forth in claim 2 further including:

first and second current mirror amplifiers, each having an input circuit and an output circuit, said first current mirror amplifier input circuit being connected to said second terminal;

a supply of input current coupled to said third terminal by means of said second current mirror amplifier input circuit;

a third transistor having a base electrode connected to said first current mirror output circuit, having an emitter electrode direct coupled to said first terminal and having a collector electrode connected to said second current mirror output circuit.

9. The combination set forth in claim 2 further including:

first and second current mirror amplifiers, each having an input circuit and an output circuit, said first current mirror amplifier input circuit being connected to said second terminal;

a supply of input current coupled to said third terminal by means of said second current mirror amplifier input circuit;

n further transistors, each having a base electrode and an emitter electrode with a base-emitter junction therebetween and a collector electrode, said *n* further transistors being connected in cascade combination with their base-emitter junctions being serially connected, the base electrode of the first of said *n* further transistors in said cascade combination being connected to said first current mirror amplifier output circuit, and the collector electrode of the last of said *n* further transistors being connected to said second current mirror amplifier output circuit.

* * * * *

UNITED STATES PATENT OFFICE
CERTIFICATE OF CORRECTION

PATENT NO. : 3,855,541

DATED : December 17, 1974

INVENTOR(S) : Arthur John Leidich

It is certified that error appears in the above-identified patent and that said Letters Patent are hereby corrected as shown below:

After "[76] Inventor: Arthur John Leidich, Flemington, N.J." insert ---[73] Assignee; RCA Corporation, New York, N.Y.---.

Signed and sealed this 6th day of May 1975.

(SEAL)
Attest:

RUTH C. MASON
Attesting Officer

C. MARSHALL DANN
Commissioner of Patents
and Trademarks